United States Patent [19]
Horigome

[11] Patent Number: 5,255,249
[45] Date of Patent: Oct. 19, 1993

[54] SEEK CONTROL APPARATUS
[75] Inventor: Junichi Horigome, Tokyo, Japan
[73] Assignee: Sony Corporation, Tokyo, Japan
[21] Appl. No.: 674,330
[22] PCT Filed: Aug. 17, 1990
[86] PCT No.: PCT/JP90/01053
  § 371 Date: Apr. 17, 1991
  § 102(e) Date: Apr. 17, 1991
[87] PCT Pub. No.: WO91/03049
  PCT Pub. Date: Mar. 7, 1991
[30] Foreign Application Priority Data
  Aug. 19, 1989 [JP] Japan .................. 1-213747
[51] Int. Cl.⁵ .......................................... G11B 17/22
[52] U.S. Cl. ........................................ 369/32; 369/33; 369/41; 369/215; 360/78.04
[58] Field of Search ............... 369/32, 33, 41, 215, 369/44.28; 360/78.04

[56] References Cited
U.S. PATENT DOCUMENTS

| | | | |
|---|---|---|---|
| 4,835,752 | 5/1989 | Nakatsu et al. | 369/32 |
| 4,858,041 | 8/1989 | Brown et al. | 369/32 |
| 4,866,687 | 9/1989 | Kasai et al. | 369/32 |
| 4,931,889 | 6/1990 | Osafuna | 369/32 |
| 5,088,075 | 2/1992 | Yokota | 369/32 |
| 5,090,001 | 2/1992 | Ito et al. | 369/32 |

Primary Examiner—Robert J. Pascal
Assistant Examiner—R. A. Ratliff
Attorney, Agent, or Firm—Lewis H. Eslinger; Jay H. Maioli

[57] ABSTRACT

A seek control apparatus for an optical disc recording-/reproducing system controls the seeking movement of a head device adapted for recording/reproducing information signals on or from an optical disc as far as a desired position on a recording surface of the optical disc. The apparatus includes a current position detection unit for detecting the current recording/reproducing track position of a head device on a recording surface of a disc-shaped recording medium, a target value outputting unit for outputting a value changed as a second power of the time as the movement target position data from the current track position as far as an object track position, and a comparator unit supplied with an output signal from the current position detection unit and an output signal from the target value outputting unit and adapted for comparing the two output signals to each other. Seek control of the head device is performed on the basis of an output signal from the comparator unit.

4 Claims, 4 Drawing Sheets

5,255,249

SEEK CONTROL APPARATUS

TECHNICAL FIELD

This invention relates to a seek control apparatus advantageously employed in a so-called compact disc player or an optical video disc player.

BACKGROUND OF ART

When it is desired to shift a beam spot formed on a disc of an optical disc apparatus, such as a so-called compact disc player, from the current track to another optical track, an optical pickup head itself is moved, if the amount of shifting is large, by way of performing a so-called track jump control, or the optical pickup head is not driven, and only an objective lens in the optical pickup head is turned to shift the beam spot to the desired track, if the amount of shift is small, by way of performing a so-called seek control.

Amount the conventional seek control apparatus, there is known such an apparatus in which the frequency signal indicating detection of a tracking error is subjected to a frequency-voltage conversion, a feedback is applied in dependence upon the resulting voltage, the number of pulses of the frequency signal indicating the detection of the tracking error is counted and the seek operation is terminated when a predetermined track count is reached. However, this seek control apparatus suffers from disadvantages that the frequency to voltage conversion cannot be achieved with high accuracy, the direction in which the objective lens is turned to shift the beam spot cannot be identified, and the counting error is apt to be produced because feedback cannot be applied to an up/down counter (43) directly. For this reason, the seek control apparatus shown in FIG. 4 is employed.

The seek control apparatus shown in FIG. 4 is made up of an up/down counter (43), a D/A converter 44, a phase compensation circuit (45), a driving circuit 46 and a biaxial coil (47). For detecting the current position of the beam spot, the seek control apparatus makes use of a tracking error signal indicating the detection of a tracking error, as shown at (a) in FIG. 5, and a pull-in signal which, conversely to the tracking error signal, reaches the maximum level at the tracking center position, as shown at (c) in FIG. 5.

The tracking error signal and the pull-in signal are waveformed, as shown at (b) and (a) in FIG. 5. From these two waveformed signals, an up/down changeover signal is produced on the basis of the phase difference of these two signals. This up/down changeover signal is supplied to an up/down signal input terminal (43b) of the up/down counter (43) by means of an input terminal (42).

To a clock input terminal (43a) of the up/down counter (43), the aforementioned tracking error signal, for example, is supplied. The up/down counter (43) is responsive to the up/down changeover signal to count up or count down to supply the count output to a D/A (digital/analog) converter (44).

The counter (43), loaded with the value of the target track to be sought, is adapted to continue its counting operation until this value is reached.

The aforementioned position information signal is converted from the digital signal into the analog signal at D/A converter (44) and thence supplied to a phase compensation circuit (45). The position information signal is phase-compensated in this phase compensation circuit (45) and thence supplied to a driving circuit (46). This driving circuit 46 actuates the objective lens into a turning or swinging motion by the driving current supplied to a biaxial coil (47). The objective lens driving operation is terminated when the up/down counter (43) has counted up to the target value of the track being sought.

The above described conventional seek control apparatus is extremely difficult to control inasmuch as the travelling speed of the beam spot as well as settling properties since the time of travel until stabilization is governed by the step response of the circuitry inclusive of the phase compensation circuit (45), control difficulties are increased when the drive voltage of the step response is saturated.

In view of the above mentioned inconveniences, it is an object of the present invention to provide a seek control apparatus in which the beam spot movement may be achieved at a higher speed and with satisfactory settling properties.

DISCLOSURE OF THE INVENTION

For accomplishing the above object, the seek control apparatus of the present invention comprises current position detection means for detecting the current recording/reproducing track position of a head device on a recording surface of a disc-shaped recording medium, target value outputting means for outputting a value changed as a second power of the time as the movement target position data from said current track position to an optional target track position, comparator means supplied with an output signal from said current position detection means and an output signal from said target value outputting means and adapted for comparing said output signal from said current position detection means and said output signal from said target value outputting means, characterized in that seek control of said head device is performed on the basis of an output signal from said comparator means.

With the seek control apparatus of the present invention, the output signal from target value outputting means is controlled so as to be changed as the second power of time, and the so-controlled output signal is supplied to comparator means, so that the driving current causing the objective lens to be turned may be maintained at approximately a constant value. In this manner, the beam spot may be moved at a constant equal acceleration without saturation of the driving voltage to permit seek control to be performed at a higher velocity and with optimum settling properties.

BEST EMBODIMENT FOR PRACTICING THE INVENTION

Figure 1:
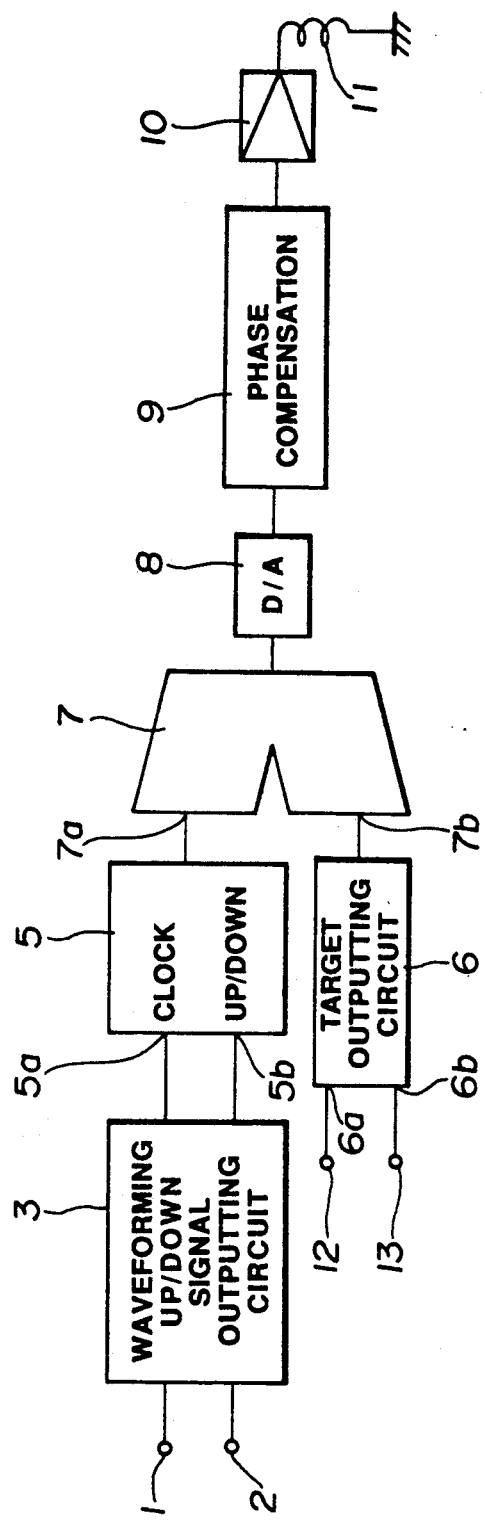
FIG. 1 is a block diagram showing an embodiment of a seek control apparatus according to the present invention.

By referring to the drawings, an embodiment of a seek control apparatus according to the present invention will be explained in detail.

FIG. 1 is a block diagram showing an embodiment of a seek control apparatus according to the present invention.

Figure 5:
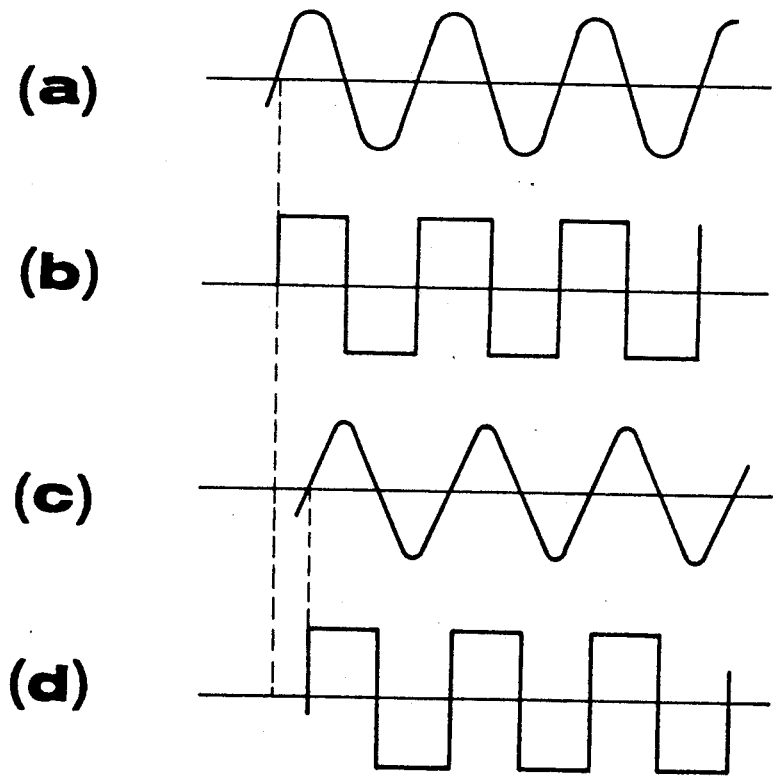
FIGS. 5(a) to (d) are waveform diagrams showing the relation between the tracking error signal and the pull-in signal in the present control apparatus, there FIGS. 5 (a), (b), (c) and (d) show the tracking error signal before waveforming, the tracking error signal after waveforming, the pull-in signal before waveforming and the pull-in signal after waveforming, respectively.

With the seek control apparatus, shown in FIG. 1, an input terminal (1), supplied with a tracking error signal, shown at (a) in FIG. 5, indicating the detection of the tracking error state of a light beam converged by an objective lens on a disc track, and an input terminal (2), supplied with a pull-in signal, shown at (c) in FIG. 5, which reaches the maximum level at the tracking center, conversely to the tracking error signal, are connected to a wave-forming and up/down signal outputting circuit (3). The wave-forming and up/down signal outputting circuit (3) is connected to a clock input terminal (5a) and to an up/down signal input terminal (5b) of an up/down counter (5). The up/down counter (5) is connected so that its output signal is supplied to an input terminal (7a) of a subtractor (7).

A track address is annexed to each track on the disc so that each track may be distinguished from another track. A target track address designating signal, which is a signal designating the address of a target track among these tracks, is supplied via input terminal (12) to an input terminal (86a) of a target value outputting circuit b, while a seek start command signal commanding the start of a seek control is supplied via input terminal (13) to an input terminal (6b) of the target value output circuit (6). The target value output circuit (6) provides a target value, which changes as a second power of the time, from the target track address designating signal supplied thereto, and transmits the target value to an input terminal (7b) of the subtractor (7). The subtractor (7) transmits the output signal to a phase compensation circuit (9) by way of a D/A (digital/analog) converter (8). The phase compensation circuit (9) transmits the output signal to a driving circuit (10). The driving circuit 10 transmits the output signal to a biaxial coil (11) of the objective lens. The one end of the biaxial coil (11) is grounded.

The operation is hereinafter explained.

When the seek start command signal is supplied to the target value output circuit (6) by means of input terminal (13), the up/down counter (5) is reset and the target track address designating signal is supplied by means of input terminal 12 to start the seek control operation. When the seek control operation is started, the tracking error signal, which has been wave-formed by the wave-forming and up/down signal outputting circuit (3), is supplied to the clock input terminal (5a) of the up/down counter (5), while the up/down signal is supplied to the up/down signal input terminal (5b).

This up/down signal is a changeover signal for selectively counting up or counting down the clock pulses supplied to the clock input terminal (5a), such as the tracking errors signal pulses. This up/down changeover signal may be obtained by an analysis which is performed at the wave forming and up/down signal outputting circuit (3) on the basis of the direction of phase deviation between the tracking error signal and the pull-in signal.

The up/down counter (5) counts up or counts down the rising edges of the waveformed tracking error signals supplied to the clock input terminal (5a) by the above mentioned up/down signal, and transmits the count value to the input terminal (7a) of the subtractor (7) as the current position information A indicating the current track address.

To the other input terminal (7b) of the subtractor (7), there is supplied a target value which is the position signal up to the target track address supplied from the target value output circuit (6).

Figure 2:
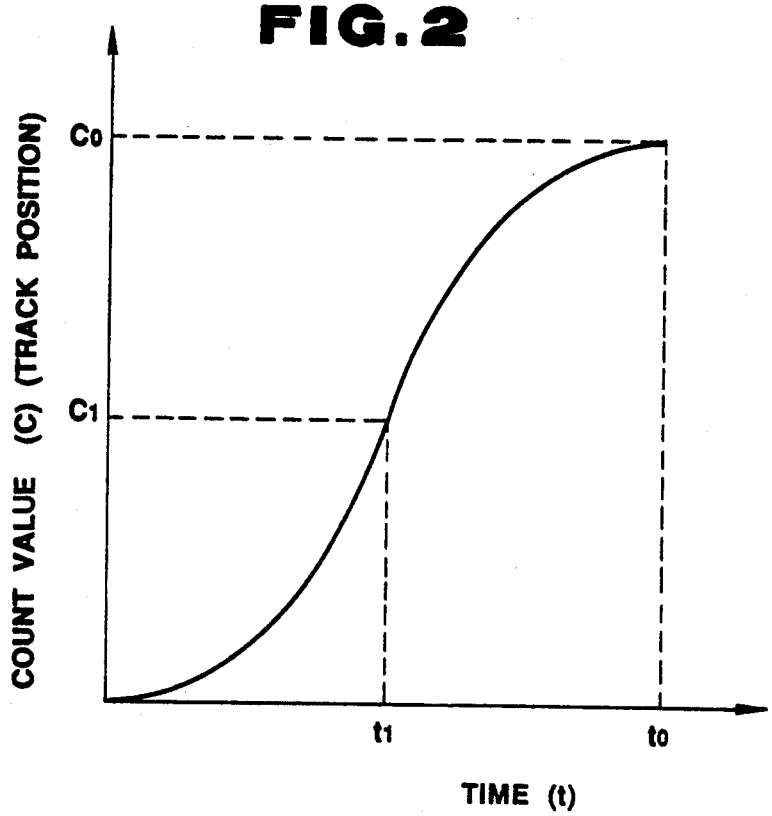
FIG. 2 is a diagrammatic view showing how the target value is supplied.

This target value is changed as the second power of time, as shown for example in FIG. 2.

That is, the target value C between time 0 and time $t_1$ is calculated and outputted using the formula $$C = at^2$$

where a is a coefficient, while the target value C between time $t_1$ and $t_0$ is calculated and outputted using the formula $$C = C_0 - a(t_0 - t)^2$$

Figure 2A:
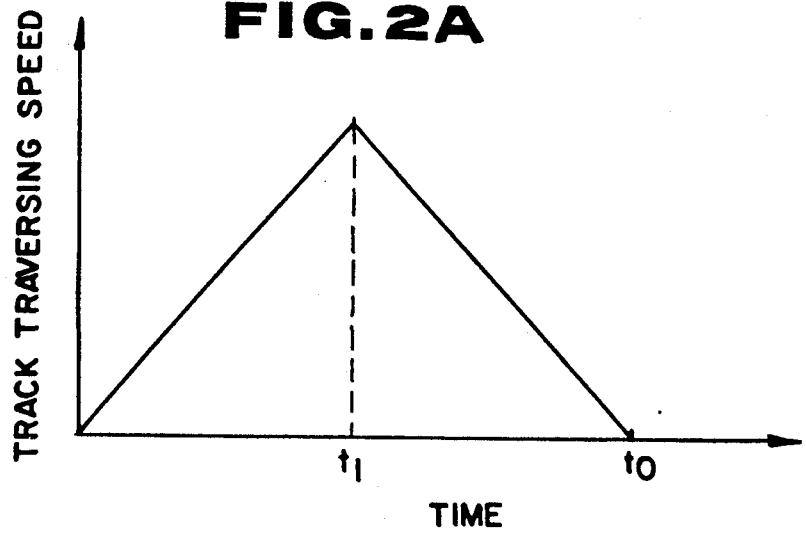
FIG. 2A is a diagram of track traversing speed as a function of time.

Thus, as FIG. 2A shows, the track traversing velocity (tilt of a tangential line drawn to a target value curve) at time $t_0$ is zero, that at time $t_1$ is maximum and that at time $t_0$ is zero. That is, since the target value is changed as a second power of time, a constant positive acceleration is applied since time 0 until time $t_1$, and a constant negative acceleration is applied since time $t_1$ until time $t_0$.

Figure 3:
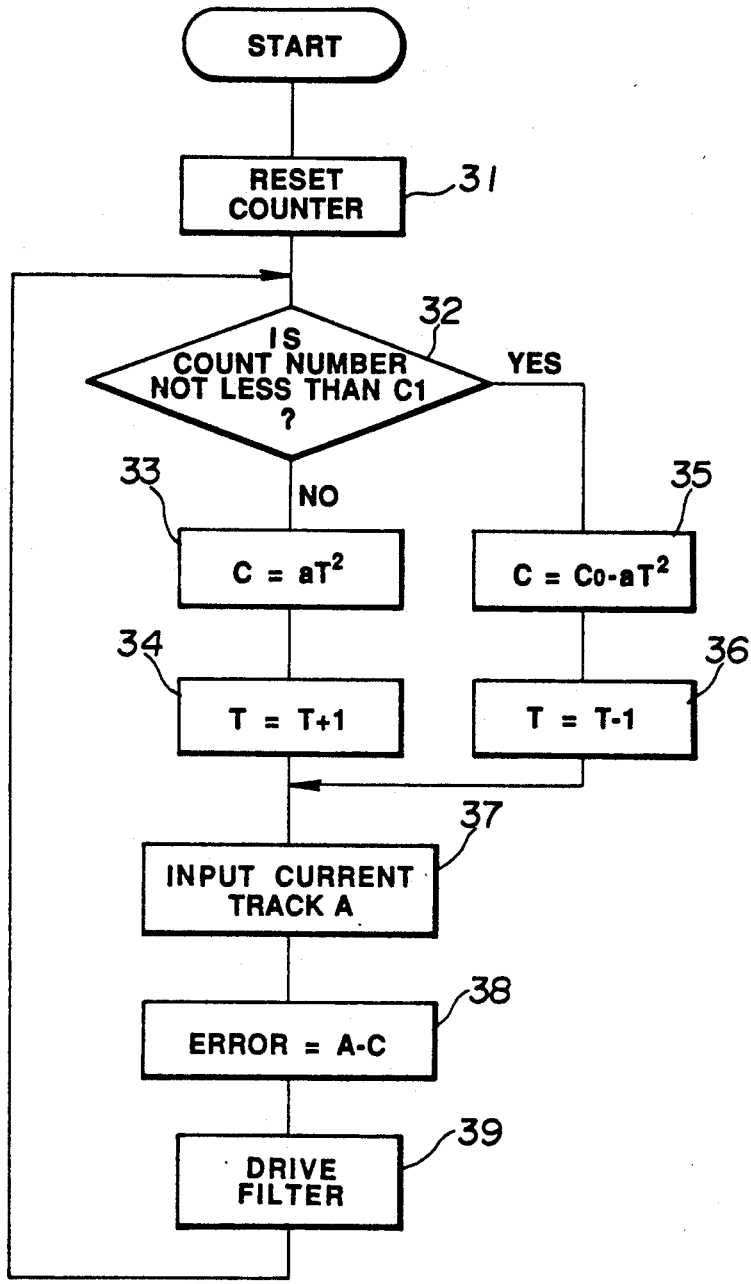
FIG. 3 is a flow chart for illustrating the operation of the embodiment.
Figure 4:
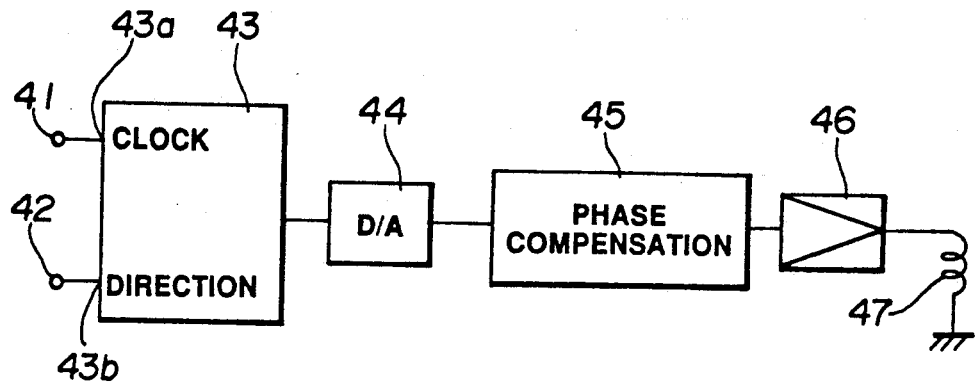
FIG. 4 is a block diagram of a conventional seek control apparatus.

An example of the method for forming such target value which is changed as a second power of time is explained by referring to FIG. 3.

When the seek start signal is supplied to the target value output circuit 6 at step 31 of FIG. 3, as mentioned hereinabove, the up/down counter (5) resets counting to start the counting of the tracking error signal from this point. The program then proceeds to step 32.

At step 32, it is checked if the count value of the up/down counter (5) is equal to or larger than a count value $C_1$ which is half the count value $C_0$ which represents the target track address shown in FIG. 2 ($C_1 = C_0/2$) in terms of the count value. If the result is No, the program proceeds to step 33 and, if the result is YES, the program proceeds to step 35.

At step 33, the target value C, the output signal of the output value outputting circuit 6, is calculated by $$C = aT^2$$

until time $t_1$ when the count value shown in FIG. 2 reaches the count value $C_1$, where a is a coefficient and T is variable indicating the elapsed time, and transmits the result to the input terminal (7b) of subtractor (7). The program then proceeds to step 34.

At step 34, the time variable T, changing with the number of times of execution of this routine, is incremented by 1 (T = T + 1), before the program proceeds to step 37.

On the other hand, at step 35, since the count value is equal to $C_1$ or larger, the target value output circuit (6) calculates the target value C by $$C = C_0 - aT^2$$

during the time when the count value is between count value $C_1$ and count value $C_0$ (between time $t_1$ and time $t_0$) as shown in FIG. 2, and transmits the result to the input terminal 7b of the subtractor (7). The program then proceeds to step 36.

At step 36, the time variable T, changing with the number of times of execution of this routine, is decremented by 1 (T=t−1) before the program proceeds to step 37.

At step 37, the current position information A, which indicates, by the above mentioned count value, the output information from up/down counter (5) indicating the current track position of the light beam, is supplied to the input terminal (7a) of the subtractor (7), before the program proceeds to step 38.

At step 38, the target value C calculated at the steps 33 and 35 is subtracted from the above mentioned current position information A by the subtractor (7), and the difference is outputted as an error signal. The program then proceeds to step 39.

At step 39, the error signal, which is the output signal from the subtractor (7), is converted into an analog signal at D/A converter (8). The error signal, thus converted into the analog signal, is phase-compensated in the phase compensation circuit (9) and supplied to the driving circuit (10). The driving circuit 10 transmits the current corresponding to the supplied error signal to the biaxial coil (11) of the objective lens to cause turning of the objective lens. The program then reverts to step 32. Thus the loop inclusive of the driving circuit (10) is in operation so that the error signal outputted from subtractor (7) will be equal to zero.

With the seek control apparatus of the present invention, as described hereinabove, the target value, which is the position signal, is controlled at the target value output circuit (6) as a function of the target address designation signal, which is the signal designating the target track to which the beam spot is to be moved, so that the target value will be changed as the second power of time. In this manner, the acceleration during the turning of the objective lens may be kept constant, while the current driving the objective lens may also be constant without saturation of the driving electrical voltage. For example, the beam spot may be moved at a constant acceleration until the track at the middle of the way as far as the target track is reached, while the velocity of the beam spot may be gradually lowered as the target track is approached from the middle position track, with the movement of the beam spot coming to a standstill when the target track is reached. In this manner, a seek control operation may be achieved at an elevated velocity and with satisfactory settling properties.

The above described control operation of the target value may be achieved without the necessity of providing a special hardware and may be achieved by a software servo of a simplified algorithm. The seek time may be set to any optional time by changing the coefficients a of the above two formulas.

Although the converting position of the formula for calculating the above mentioned target value is set so as to be the position at which the count value is one half the target count value, it may be any other position. The up/down counter (5) may be replaced by any device capable of recognizing the driving direction of the objective lens. In such case, the pull-in signal used for direction analyses may be eliminated.

With the seek control apparatus of the present invention, the output signal from the current position sensor means sensing the current position of the light beam on the disc and the output signal from the target value output means controlling the target value or the position signal of the target track so as to be changed as the second power of time and outputting the thus controlled target value, are supplied to comparator means for comparison, and the objective lens is turned as a function of the output signal from the comparator means, thereby rendering the driving current constant. Thus the seek control may be achieved with satisfactory settling and at an elevated velocity without the driving voltage becoming saturated. In addition, the movement time of the beam spot may be optionally set by controlling the target value.

The control causing the target value to be changed as a second power of time may be executed in a digital servo by a software with a simplified algorithm and hence may be achieved inexpensively without the necessity of providing special hardware equipment.

What is claimed is:

1. A seek control apparatus comprising:
   current position detection means for detecting the current recording/reproducing track position of a head device on a recording surface of a disc-shaped recording medium,
   target value outputting means for outputting a target value C that changes as a function of the second power of the time as the movement target position data from said current track position to an optional target track position, wherein the target value C is given by $$C = at^2$$

for time 0 to time $t_1$, a being a coefficient, and by $$C = C_0 - a(t_0 - t)^2$$

for time $t_1$ to time $t_0$, and
   comparator means supplied with an output signal from said current position detection means and an output signal from said target value outputting means and adapted for comparing said output signal from said current position detection means and said output signal from said target value outputting means,
   characterized in that seek control of said head device is performed on the basis of an output signal from said comparator means to accelerate said head device from a time 0 when said head device is at said current track position to an intermediate time $t_1$ and decelerate said head device from time $t_1$ to time $t_0$ when said head device is at said target track position.

2. The seek control apparatus according to claim 1 wherein the target value C is such that the track traversing speed is zero at time 0, becomes maximum at time $t_1$, and becomes zero at time $t_0$.

3. The seek control apparatus according to claim 2 wherein said head device is so controlled that the acceleration between time 0 and time $t_1$ and the deceleration between time $t_1$ and time $t_0$ are equal in absolute magnitude.

4. The seek control apparatus according to claim 2 wherein said time $t_1$ is the time corresponding to one half the difference between the target value and the current track position.

* * * * *

UNITED STATES PATENT AND TRADEMARK OFFICE
CERTIFICATE OF CORRECTION

PATENT NO. : 5,255,249
DATED : October 19, 1993
INVENTOR(S) : Junichi Horigome

It is certified that error appears in the above-indentified patent and that said Letters Patent is hereby corrected as shown below:

On the Title Page, item [56], change "Osafuna" to --Osafune--

Column 6, line 33, change "C32" to --C=--

Signed and Sealed this

Thirteenth Day of June, 1995

Attest:

BRUCE LEHMAN

Attesting Officer

Commissioner of Patents and Trademarks